United States Patent
Roemmelt

(10) Patent No.: US 12,447,254 B2
(45) Date of Patent: Oct. 21, 2025

(54) DEVICE AND METHOD FOR AIR-FREE FILLING OF A FLUID MANAGEMENT SYSTEM

(71) Applicant: FRESENIUS MEDICAL CARE DEUTSCHLAND GMBH, Bad Homburg (DE)

(72) Inventor: Nico Roemmelt, Hambach (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 480 days.

(21) Appl. No.: 17/780,534

(22) PCT Filed: Jan. 22, 2021

(86) PCT No.: PCT/EP2021/051418
§ 371 (c)(1),
(2) Date: May 27, 2022

(87) PCT Pub. No.: WO2021/148586
PCT Pub. Date: Jul. 29, 2021

(65) Prior Publication Data
US 2023/0144031 A1  May 11, 2023

(30) Foreign Application Priority Data

Jan. 25, 2020 (DE) .................... 10 2020 000 466.0

(51) Int. Cl.
*A61M 1/36* (2006.01)
*A61M 1/26* (2006.01)

(52) U.S. Cl.
CPC .......... *A61M 1/3643* (2013.01); *A61M 1/267* (2014.02); *A61M 2205/3331* (2013.01)

(58) Field of Classification Search
CPC ................ A61M 1/3643; A61M 1/267; A61M 2205/3331
See application file for complete search history.

(56) References Cited

U.S. PATENT DOCUMENTS

| 5,702,606 | A | 12/1997 | Peter, Jr. et al. |
| 5,893,382 | A | 4/1999 | Bardelli et al. |
| 2004/0089594 | A1 * | 5/2004 | Collins ............... A61M 1/3437 210/197 |

(Continued)

FOREIGN PATENT DOCUMENTS

| DE | 69623563 T3 | 8/2006 |
| DE | 102010025516 A1 | 12/2011 |

(Continued)

OTHER PUBLICATIONS

International Search Report and Written Opinion issued in corresponding International Patent Application No. PCT/EP2021/051418 (with English translation of International Search Report) mailed Mar. 26, 2021 (19 pages).

(Continued)

*Primary Examiner* — Jessica Arble
(74) *Attorney, Agent, or Firm* — Kilyk & Bowersox, P.L.L.C.

(57) ABSTRACT

The invention relates to a device and a method for filling and flushing the hydraulics of a dialysis machine, whereby a removal of air bubbles from the hydraulics is ensured.

17 Claims, 2 Drawing Sheets

(56) References Cited

U.S. PATENT DOCUMENTS

| | | | |
|---|---|---|---|
| 2013/0112629 A1* | 5/2013 | Brandl | A61M 1/1682 210/791 |
| 2014/0216250 A1 | 8/2014 | Meyer et al. | |
| 2014/0217020 A1 | 8/2014 | Meyer et al. | |
| 2017/0232179 A1 | 8/2017 | Wojke et al. | |
| 2020/0054808 A1 | 2/2020 | Gagel et al. | |

FOREIGN PATENT DOCUMENTS

| | | |
|---|---|---|
| DE | 102010032179 A1 | 1/2012 |
| DE | 102014011673 A1 | 2/2016 |
| DE | 102017000495 A1 | 7/2018 |
| EP | 2716310 A1 | 4/2014 |
| JP | 2015198932 A | 11/2015 |
| WO | 2012161744 A2 | 11/2012 |

OTHER PUBLICATIONS

Office Action issued in corresponding German Patent Application 102020000466.0 mailed Oct. 21, 2020 (11 pages).
Office Action issued in corresponding Japanese Patent Application No. 2022-544198 dated Oct. 17, 2024 (with English translation)(9 pages).

\* cited by examiner

DEVICE AND METHOD FOR AIR-FREE FILLING OF A FLUID MANAGEMENT SYSTEM

This application is a National Stage Application of PCT/EP2021/051418, filed Jan. 22, 2021, which claims priority to German Patent Application No. 10 2020 000 466.0, filed Jan. 25, 2020.

TECHNICAL FIELD

The invention relates to a device and a method for the air-free filling of the hydraulics of a fluid management system, e.g. of a dialysis machine.

BACKGROUND

Modern dialysis machines for the chronic hemodialysis prepare the required dialysis solution online in a machine-internal hydraulics system. This machine-internal hydraulic system conveys the dialysis solution into the machine-external extracorporeal blood circulating circuit, and the spent dialysate from the blood circulating circuit is received by this hydraulic system and is guided into the outlet.

To ensure the hygiene of the system, a routine disinfection of this machine-internal hydraulic system is necessary.

In particular when the hydraulic system is filled with air prior to the disinfection, a complete removal of the air has to be ensured in response to the filling of the hydraulics with liquid, in order to be able to ensure a complete wetting of the surfaces with disinfectant. The heat conduction until the sealing during the hot disinfection is thus also ensured, as well as the complete flush-out of the disinfectant after the disinfection.

In the case of a simple filling of the hydraulics with an even flow of the flushing solution, in particular components of the hydraulics, in which the geometry of said hydraulics impedes the removal of gas bubbles through the flushing solution, cannot be filled in an air-free manner. The same applies for chambers and hollow spaces comprising a geometry, which has the result that the ascending bubbles are located outside of the liquid flow. Constrictions of the flow cross section of the fluid lines in the hydraulics, e.g. a coupling point for the tube kit of an extracorporeal blood circuit, in particular the online port is an example for a special geometry of this type.

The object of the present invention lies in the provision of a fluid management system, in particular of a hydraulic system of a blood treatment machine for the renal replacement therapy, and a method for flushing the fluid management system, which ensure a bubble-free filling of the machine-internal fluid lines.

SUMMARY OF THE INVENTION

According to the teaching of the present invention, this object is solved by means of a device as described herein and a method as described herein. Special embodiments are subject matter are also described herein.

The invention relates to a fluid management system. The hydraulic system of the dialysis machine, e.g., which serves to produce and/or convey the dialysis solution, can be a fluid management system of this type. The fluid management system has a machine-internal fluid line (as machine component) comprising a fluid input for connection to a supply with a flushing liquid, and a fluid output for connection to a line for discharging the flushing liquid.

According to the claims, machine-internal can thereby mean that the fluid line is arranged completely inside the machine in one embodiment. In another embodiment, a machine-internal fluid line likewise also comprises a fluid line, which is guided only partially within the machine.

A locking device, which divides the fluid line into a first and a second fluid line portion, is arranged in the fluid line.

The first fluid line portion has a first fluid conveying means, which, during operation thereof according to the invention, is arranged upstream of the locking device.

The second fluid line portion has a second fluid conveying means, which, during operation thereof according to the invention, is arranged downstream from the locking device.

The fluid management system has a control device for controlling the locking device, the first fluid conveying means, and the second fluid conveying means, wherein the control device is configured to control the first fluid conveying means for conveying liquid in the direction of the locking device in order to increase a pressure in the first fluid line portion upstream of the locking device, and which is configured to control the second fluid conveying means for conveying liquid away from the locking device in order to lower a pressure in a second fluid line portion of the fluid line system downstream from the locking device, and wherein the control device is configured to open the locking means at least once in the case of increased pressure in the first liquid portion and in the case of lowered pressure in the second liquid portion.

The control device can thereby comprise a processor, a data storage medium, and data lines. A program code, in response to the execution of which corresponding signals are sent to the respective components, can be stored on the storage medium.

It is also possible to alternately open and to close the locking device repetitively, e.g. 3 to 7 times. A repetitive opening and closing can make it possible that a more complete or complete removal of all air bubbles in the fluid line portion is attained.

The fluid line portion can be closed to form a recirculation circuit, whereby the consumption of flushing solution is reduced. So that the air can be removed from the recirculation circuit, an air separating means can be arranged in the first or preferably in the second fluid line portion. The air separating means can be arranged downstream from the locking means. A chamber comprising an inlet and an outlet and a third opening in the upper region of the chamber can be used as air separating means of this type to discharge air from the chamber. The air separating means can also be a connection to the outside to a pump, wherein the liquid, together with the bubbles, is conveyed out of the fluid portion. A water input chamber, e.g., in the inlet of the fluid management system or a chamber in the outlet of the fluid management system can be used as air separating chamber. As a result of the recirculating, there is no longer a dependency on a high delivery quantity through the water source in the case of higher flows.

The fluid line, in particular the second fluid line portion, can have at least one constriction of the through lumen. Air bubbles cannot pass or can only pass with difficulty, in particular upstream of constrictions of the through lumen of the fluid line.

Bottlenecks of this type are present, e.g., at the coupling points of the hydraulics for the extracorporeal blood circuit. Coupling points of this type are used to convey dialysate, e.g. directly, into the patient blood. This is referred to here as a substitution port. Another coupling point, the flushing port, is used as connection of the patient connection in response to the filling and flushing of the tube kit prior to the onset of the treatment. An effective disinfection is particularly important here, because there is a direct contact of hydraulics and extracorporeal blood circuit.

To optimally remove the air bubbles at such bottlenecks, the locking means can be arranged upstream of this constriction, and the second fluid conveying means can be arranged downstream from this constriction. In the case of a closed locking means, a negative pressure is created between locking means and second fluid conveying means in response to the operation of the second fluid conveying means. This negative pressure initially increases the volume of gas bubbles, which are located in this region. By operating the first fluid conveying means upstream of the locking device, the pressure in the fluid line upstream of the locking device can simultaneously be increased.

After build-up of a pressure difference between the fluid line portions upstream of and downstream from the locking device, a pressure compensation largely results in response to opening the locking device, and thus a shock pressure downstream from the locking device, which divides the gas bubbles, which are increased and destabilized by the negative pressure, into small microbubbles. These gas bubbles can pass the bottlenecks in the fluid line portion more easily. Due to the negative pressure as well as the flow peak in the fluid line portion downstream from the locking device, these small bubbles are then withdrawn through the constriction before they come together again to form a larger bubble, and can thus be removed from the fluid line system.

This effect is particularly effective when the compliance of the fluid line between the locking device and the constriction of the through lumen is as small as possible, e.g., between 0.5 and 50 cm, preferably is 10-30 cm.

To ensure that a sufficient pressure difference is present in response to opening the locking device, the fluid management system can have pressure measuring means, and the control device can be configured to control the opening or the alternating opening and closing of the locking device via the pressure values determined by the pressure measuring means inside the internal fluid line portion. For this purpose, a pressure measuring means is arranged in particular in fluid connection with the first fluid line portion, and a second pressure measuring means in fluid connection with the second fluid line portion.

A sufficient pressure difference is reached, for example, when the difference lies between 1000 and 3000 hPa, preferably between 1600 and 2500 hPa.

In the alternative or in addition, the fluid management system can have a time measuring means. The control device can then be configured to control the opening or the alternating opening and closing of the locking device via the times determined by means of these time measuring means. In the case of known delivery rates of the pumps, the reaching of a sufficient pressure difference can also be ensured by the duration of the phases prior to opening the locking device or the duration of the phase prior to opening the locking device, respectively, and the duration of the opening of the locking device.

The locking means can be closed, e.g., for 1-5 seconds, preferably for 2 seconds.

The opening of the locking means can take place for 2-6 seconds, preferably for 4 seconds.

In addition, the opening of the valve can take place quickly, so that the pressure compensation takes place in a time interval of between 20 and 500 ms, preferably of between 20 and 60 ms. Gas bubbles can thus be further transported particularly effectively.

In the alternative, the control device can be configured to control the opening or the alternating opening and closing of the locking device as a function of a certain number of operating cycles of at least one fluid conveying means, when membrane pumps or a balance chamber timing, e.g., are used as pumping means.

The locking means can be any means, which is suitable to separate the fluid line portions from one another in such a way that a required pressure difference results. The locking means can preferably be a valve, e.g. an electromagnetic valve or a tubing pinch valve.

To convey the flushing liquid, the fluid management system can have any type of fluid conveying means, which is suitable to build up the required positive pressure or the required negative pressure, respectively. The fluid conveying means can preferably be a pump, e.g. peristaltic pumps, membrane pumps or particularly preferably geared pumps.

The fluid management system can be, e.g., part of a hydraulic system of a blood treatment machine for the renal replacement therapy, e.g. of a machine for the hemodialysis. In the hydraulic hydraulic system of a blood treatment machine of this type, the degassing pump, e.g., can be the first fluid conveying means for building up a positive pressure, and the flow pump can be the second fluid conveying means for generating a negative pressure. Both pumps can be geared pumps.

The invention also relates to a method for the bubble-free filling of a fluid management system according to the invention with a flushing liquid, wherein the method consists in the filling of the system with a flushing liquid by operating the first and/or the second fluid conveying means. The locking means is open during the filling of the fluid line. After the filling of the fluid line, the system can initially be flushed for a certain time period, e.g. 5-60 seconds, by operating the first and/or the second fluid conveying means. In the next step, the locking device is closed. To increase the pressure in the first fluid line portion and/or to decrease the pressure in the second fluid line portion, at least one of the fluid conveying means continues to operate. The conveyance of the fluid can also be interrupted. After closing the locking means, at least one is then operated, so that a pressure difference can form. After a pressure difference has formed, the locking device is opened.

The closing and opening of the locking device can take place repeatedly, preferably 3 to 9 times.

For the optimal removal of the air bubbles, the opening of the locking means can take place in response to the simultaneous operation of at least the second fluid conveying means.

Further details and advantages of the invention will be described in more detail on the basis of the exemplary embodiments illustrated in the drawings.

DETAILED DESCRIPTION OF AN EXEMPLARY EMBODIMENT

Figure 1:
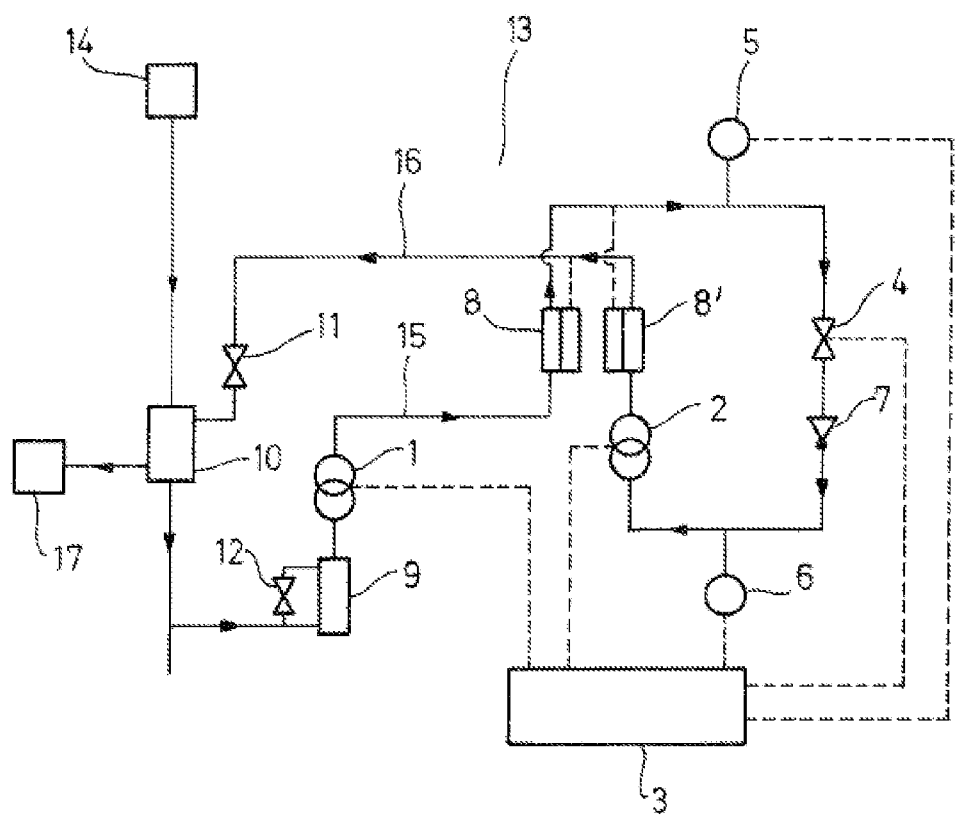
FIG. 1 shows a schematic illustration of a fluid management system according to the invention.

A portion of the hydraulics of a dialysis machine is illustrated in FIG. 1 in a schematic manner, as an example for a fluid management system.

The flushing medium source 14 initially supplies a flushing solution into the water input chamber 10. To fill the hydraulics, the flushing solution is guided into the first fluid portion 15 through the degassing pump 1 and the degassing chamber 9 into the fresh water chamber of the left balance chamber 8, and through the locking device 4 into the second fluid portion 16 by operating the flow pump 2. There, the flushing solution is guided back into the water input chamber 10 with a ventilation means 17 via the waste water side of the right balance chamber 8'. A pressure measuring means 5 is arranged in the first fluid portion 15 upstream of the locking device 4. Pressure measuring means 6 is arranged in the second fluid portion 16 downstream from the locking device 4. In addition, a coupling point 7 for an extracorporeal blood tube system is located in the second fluid portion 16.

This coupling point 7 is arranged on the machine front. After coupling to the extracorporeal blood tube system, a direct delivery of dialysate from the hydraulics into the extracorporeal blood circuit can thus take place. To provide for a complete disinfection of this coupling point, the latter has, e.g., a coaxial design comprising an inner tube and an outer tube arranged coaxially around it. The inner tube is recessed with respect to the outer tube. In the flushing or disinfecting mode, the outer tube is sealed against the outside by means of a flap. In the flushing or disinfecting mode, the flushing or disinfecting solution, respectively, flows through the inner tube into the outer tube arranged coaxially around it, and from there into an outlet line. The distance between inner and outer tube is 6 mm. The coupling point 7 is furthermore inclined along its longitudinal axis in such a way that the liquid outlet is arranged lower than the output of the inner tube, in order to facilitate a complete emptying of the port of liquid. Air bubbles can thus get stuck upstream of the recessed inner tube and cannot readily be transported away into the outlet in the flushing mode in response to a laminar flow through this narrow gap of the outer tube against the buoyancy force. In particular this bottleneck, which forms the connection point to the tube system and thus to a possibly infectious medium, would then not be completely accessible for a disinfecting solution. The air-free filling furthermore optimizes the heat transfer through the liquid disinfectant until the sealing of the flap and the complete flush-out of the disinfecting solution after conclusion of the disinfection.

To achieve a complete removal of air bubbles, the dialysis machine has a control unit 3. This control unit 3 is configured to fill the fluid portions 15 and 16 by operating the flow pump 2 with a continuous flow, and to circulate them subsequently.

In response to simultaneous operation of the flow pump 2 and of the degassing pump 1, the locking device 4 is then closed. A positive pressure is built up in the first fluid portion 15, a negative pressure results in the second fluid portion 16. Air bubbles, which have not passed a constriction of the through lumen in the second fluid portion 16 during the flushing, initially expand in the negative pressure. As soon as the pressure measuring means 5 and 6 detect a sufficient pressure difference between first 15 and second fluid portion 16, the locking device 4 is opened, whereby a pressure compensation takes place. By means of the shock pressure in the second fluid portion 16, the air bubbles are divided into smaller gas bubbles. The latter are then conveyed immediately through the degassing pump through the constriction and then reach into the water input chamber 10, where they are discharged into the atmosphere. When the fluid level in the water input chamber falls below a predetermined value, it is filled with flushing solution.

If a degassing is to be avoided during phases with high flow, the degassing throttle 9 can be bypassed by opening the valve 12.

The process of alternately closing and opening the locking device 4 can be repeated several times, e.g. 7 times.

The fluid conveying means 1 and 2 are subsequently stopped, the system is ventilated, and the valves are closed.

Figure 2:
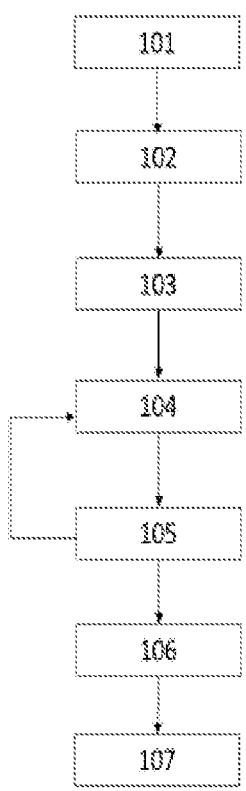
FIG. 2 shows an exemplary embodiment of a method described here on the basis of a schematic illustration.

A flow chart of an embodiment of the method according to the invention is illustrated in FIG. 2.

At the beginning of the dialysis treatment, the outer tube of the coaxially constructed coupling point of the dialysis machine for the extracorporeal blood tube system and the fluid line leading away therefrom is emptied and is thus filled with air.

In a first step 101 of the filling process, the water input chamber 10 illustrated in FIG. 1, and a compartment of the balance chambers are in each case filled with water.

In a second method step 102, the flushing solution is circulated in the fluid circuit, which is shown in FIG. 1. The valves 4, 11, and 12 are open. This method step lasts approx. 5 seconds.

In a third method step 103, the coupling point is flushed with a continuous flow. This method step 103 lasts approx. 5 seconds.

In a fourth method step 104, the valve 4 is closed, and a positive pressure of above 1800 hPa is built up upstream of the valve by operating the degassing pump 1. A negative pressure of less than −400 hPa is built up downstream from the valve 4 by operating the flow pump 2. This method step lasts approx. 2 seconds.

In a fifth method step 105, the pressure difference is reduced, in that valve 4 is opened for approx. 4 seconds.

To completely remove the air, the method steps 104 and 105 are then repeated up to seven times.

In a sixth method step 106, the pumps 1 and 2 are stopped, and the system is ventilated.

In a seventh method step 107, the used valves are closed.

REFERENCE LIST

First pump 1
Second pump 2
Control unit 3
Locking means 4
First pressure measuring means 5
Second pressure measuring means 6
Coupling point for extracorporeal blood tube system 7
Balance chambers 8
Degassing chamber 9
Water input chamber 10
Valve 11
Valve 12
Fluid management system 13
Flushing medium source 14
First fluid line portion 15
Second fluid line portion 16
Ventilation means 17

The invention claimed is:

1. A dialysis machine comprising a machine-internal fluid line that is completely or partially inside the dialysis machine, and a fluid management system that is configured to be connected to a fluid input and a fluid output, the fluid input being configured to form a fluid communication with a supply of a flushing liquid, and the fluid output being configured for discharging the flushing liquid, the fluid management system comprising a locking device in the fluid line, which divides the fluid line into a first fluid line portion and a second fluid line portion, a first fluid conveying means in the first fluid line portion arranged upstream of the locking device, a second fluid conveying means in the second fluid line portion arranged downstream from the locking device, and a control device for controlling the locking device, the first fluid conveying means, and the second fluid conveying means, wherein the control device is configured to control the first fluid conveying means for conveying liquid in the direction of the locking device in order to increase a pressure of liquid in the first fluid line portion relative to a pressure of liquid in the second fluid line portion, and the control device is configured to control the second fluid conveying means for conveying liquid away from the locking device in order to decrease a pressure in the second fluid line portion relative to the pressure in the first fluid line portion, and the control device is configured to open the locking device at least once when the pressure in the first fluid line portion is greater than the pressure in the second fluid line portion.

2. The dialysis machine according to claim 1, wherein the control device is configured to repeatedly close the locking device for building up a pressure difference between the first and second fluid line portion, and to open it to compensate for the pressure difference.

3. The dialysis machine according to claim 1, wherein the first and the second fluid line portion are closed to form a recirculation circuit and the recirculation circuit has an air separating means.

4. The dialysis machine according to claim 1, wherein one of the first fluid line portion and the second fluid line portion has at least one constriction, the locking device is arranged upstream of the constriction, and the second fluid conveying means is arranged downstream from the constriction.

5. The dialysis machine according to claim 4, wherein the locking device is arranged 0.5 to 50 cm upstream of the constriction of the through lumen in the fluid line portion.

6. The dialysis machine according to claim 4, wherein the constriction of the first fluid line portion or the second fluid line portion is arranged in a connection point for connection to an extracorporeal blood circuit.

7. The dialysis machine according to claim 1, wherein the fluid management system further comprises a pressure measuring means in the first fluid line portion, a pressure measuring means in the second fluid line portion, or pressure measuring means in both the first fluid line portion and the second fluid line portion, and the control device is configured to control the opening or the alternating opening and closing of the locking device in response to pressure values determined by the at least one pressure measuring means.

8. The dialysis machine according to claim 7, wherein an opening of the locking device takes place when a pressure difference between the first fluid line portion and the second fluid line portion of from 1000 to 3000, hPa, has been reached.

9. The dialysis machine according to claim 1, wherein the fluid management system has a time measuring means, and the control device is configured to control the opening or the alternating opening and closing of the locking device over the times determined by the time measuring means.

10. The dialysis machine according to claim 1, wherein the control device is configured to control the opening or the alternating opening and closing of the locking device as a function of an operating cycle of at least one of the fluid conveying means.

11. The dialysis machine according to claim 1, wherein the locking device is a valve.

12. The dialysis machine according to claim 1, wherein the fluid conveying means are pumps.

13. The dialysis machine according to claim 1, wherein the dialysis machine is a blood treatment machine for renal replacement therapy.

14. The dialysis machine according to claim 4, wherein the locking device is arranged 10-30 cm upstream of the constriction.

15. The dialysis machine according to claim 7, wherein the fluid management system is configured to open the locking device when a pressure difference between the first fluid line portion and the second fluid line portion reaches a pressure of from 1600 to 2500 hPa.

16. The dialysis machine according to claim 1, wherein the locking device is an electromagnetic valve or a tubing pinch valve.

17. The dialysis machine according to claim 1, wherein each of the first fluid conveying means and the second fluid conveying means is a peristaltic pump or a geared pump.

* * * * *